US010326343B2

(12) United States Patent
Walsh (10) Patent No.: US 10,326,343 B2
(45) Date of Patent: Jun. 18, 2019

(54) MAGNETIC-DRIVE AXIAL-FLOW FLUID DISPLACEMENT PUMP AND TURBINE

(71) Applicant: Raymond J. Walsh, Dallas, TX (US)

(72) Inventor: Raymond J. Walsh, Dallas, TX (US)

(*) Notice: Subject to any disclaimer, the term of this patent is extended or adjusted under 35 U.S.C. 154(b) by 0 days.

(21) Appl. No.: 16/190,072

(22) Filed: Nov. 13, 2018

(65) Prior Publication Data

US 2019/0103793 A1    Apr. 4, 2019

Related U.S. Application Data

(63) Continuation-in-part of application No. 15/878,236, filed on Jan. 23, 2018, which is a continuation-in-part
(Continued)

(51) Int. Cl.
*H02K 21/14* (2006.01)
*H02K 16/02* (2006.01)
(Continued)

(52) U.S. Cl.
CPC ............ *H02K 16/025* (2013.01); *F01D 1/20* (2013.01); *F04D 25/06* (2013.01);
(Continued)

(58) Field of Classification Search
CPC ............ H02K 7/08; H02K 7/083; H02K 7/09; H02K 1/02; H02K 1/12; H02K 1/17; H02K 1/22; H02K 1/223; H02K 1/27; H02K 1/276; H02K 1/278; H02K 1/2786; H02K 11/00; H02K 11/04; H02K 11/048; H02K 23/04; H02K 23/30; H02K 23/40; H02K 16/00; H02K 16/02; H02K 21/02;
(Continued)

(56) References Cited

U.S. PATENT DOCUMENTS

6,252,317 B1 * 6/2001 Scheffer ................. H02K 1/272
310/267
2004/0239199 A1 * 12/2004 Qu ........................ H02K 21/16
310/114
(Continued)

*Primary Examiner* — Tran N Nguyen
(74) *Attorney, Agent, or Firm* — Scott D. Swanson; Shaver & Swanson, LLP (57) ABSTRACT

What is disclosed are embodiments of magnetic torque transfer devices utilizing torque transfer by magnetic induction in which an induction cylinder fabricated from an electrical conductor is interposed into the gap between a pair of magnetically coupled primary and secondary rotors. Rotation of the induction cylinder relative to the coupled rotors evokes magnetic torque transfer in accordance with Lenz's Law. The primary rotor rotates within a toroid shaped stator. The stator may be configured for rolling biphasic coil control. The secondary rotor is attached to a propeller. The device may function as a turbine when fluid is directed to flow over the propeller. The device may function as a pump when AC power is supplied to the stator. Rolling biphasic motor control includes dividing motor coils into increments, then configuring groups of contiguous increments into virtual coils, which revolve in tandem with the primary rotor so to achieve continuous and optimal torque transfer with minimum torque ripple.

28 Claims, 8 Drawing Sheets

Related U.S. Application Data of application No. 14/523,687, filed on Oct. 24, 2014, now Pat. No. 10,125,814, said application No. 15/878,236 is a continuation-in-part of application No. 14/185,910, filed on Feb. 20, 2014, now Pat. No. 9,876,407, application No. 16/190,072, filed on Nov. 13, 2018, which is a continuation-in-part of application No. 14/523,687, filed on Oct. 24, 2014, now Pat. No. 10,125,814.

(60) Provisional application No. 61/895,115, filed on Oct. 24, 2013, provisional application No. 61/766,705, filed on Feb. 20, 2013, provisional application No. 61/891,829, filed on Oct. 16, 2013, provisional application No. 61/892,019, filed on Oct. 17, 2013, provisional application No. 61/894,489, filed on Oct. 23, 2013, provisional application No. 61/899,204, filed on Nov. 2, 2013, provisional application No. 61/906,136, filed on Nov. 19, 2013, provisional application No. 61/906,703, filed on Nov. 20, 2013, provisional application No. 62/596,376, filed on Dec. 8, 2017.

(51) Int. Cl.

| | | |
|---|---|---|
| *H02K 7/09* | (2006.01) | |
| *H02K 7/14* | (2006.01) | |
| *H02K 7/18* | (2006.01) | |
| *F01D 1/20* | (2006.01) | |
| *H02K 11/30* | (2016.01) | |
| *F16C 32/04* | (2006.01) | |
| *F04D 25/06* | (2006.01) | |
| *H02K 11/21* | (2016.01) | |

(52) U.S. Cl.
CPC .......... *F16C 32/0408* (2013.01); *H02K 7/09* (2013.01); *H02K 7/14* (2013.01); *H02K 7/1823* (2013.01); *H02K 11/21* (2016.01); *H02K 11/30* (2016.01); *H02K 21/14* (2013.01)

(58) Field of Classification Search
CPC ...... H02K 21/029; H02K 21/12; H02K 21/14; H02K 21/20; H02K 21/22; H02K 21/225; H02K 21/46; H02K 29/00; H02K 29/03; F16C 25/04; F16C 25/045; F16C 32/04; F16C 32/0408; F16C 32/041; F16C 32/0412; F16C 32/042; F16C 32/0425; F16C 32/043; F16C 32/0436; F16C 32/044; F16C 32/0448
See application file for complete search history.

(56) References Cited

U.S. PATENT DOCUMENTS

2008/0174194 A1* 7/2008 Qu ................ H02K 7/1823
 310/114
2009/0134735 A1* 5/2009 Yoshikawa ............ H02K 16/02
 310/198

* cited by examiner

MAGNETIC-DRIVE AXIAL-FLOW FLUID DISPLACEMENT PUMP AND TURBINE

PRIORITY/CROSS REFERENCE TO RELATED APPLICATIONS

This application claims priority benefit to U.S. Patent Application No. 62/596,376 filed Dec. 8, 2017, and is a continuation-in-part of co-pending U.S. patent application Ser. No. 15/878,236 filed Jan. 23, 2018, and is a continuation-in-part of U.S. patent application Ser. No. 14/523,687 filed on Oct. 24, 2014, which issues as patent U.S. Pat. No. 10,125,814 on Nov. 13, 2018, the disclosures of which are hereby incorporated by reference in their entireties.

TECHNICAL FIELD

The disclosed technology generally relates to pumps and turbines that employ permanent magnet motors and generators having magnetically coupled rotors, means and methods of transferring torque, as well as pumps and turbines that employ passive magnetic bearings.

BACKGROUND

U.S. patent application Ser. No. 15/878,236 discloses magnetic induction torque transfer, which employs an induction cylinder interposed between rotors for torque transfer by magnetic induction in accordance with Lenz's Law of Induction. U.S. patent application Ser. No. 15/878,236 also discloses rolling biphasic coil control, a method of configuring and energizing stator coils that optimizes torque and minimizes torque ripple. Such a permanent magnet motor may also serve as a generator. By the same token, a pump employing a permanent magnet motor may also serve as a turbine. Fabrication of the machine is the same regardless of how the machine is employed.

U.S. Ser. No. 10/125,814 entitled Axial-Loading Magnetic Reluctance Device issues on Nov. 13, 2018, and describes embodiments aimed at limiting the axial displacement of a shaft or tube.

Axial-flow pumps and turbines generally contain a propeller or an impeller inside a pipe. Rotation of this propeller moves fluids through the pipe. This fluid can be air, water, or any gas or liquid. The motor that drives the shaft and propeller can be sealed and mounted inside the pipe or mounted outside the pipe with the shaft passing through the wall of the pipe. This design is large and unwieldy compared to other pump designs, and the shaft must be sealed where it penetrates the pipe. Axial-flow pumps that employ permanent magnets may function in reverse as turbines, in which case fluid flowing through the pipe induces rotation of a propeller/impellor located inside a pipe, which drives a generator or alternator in order to produce electricity.

SUMMARY OF THE DISCLOSURE

The Magnetic Torque Transfer Device, hereafter the pump or turbine, is a device that functions as a pump for moving fluid such as air or water when electricity is supplied, and functions as a turbine for generating electricity from the movement of fluid. The Magnetic Torque Transfer Device is one invention but has two applications: the movement of fluid when power is applied or the generation of electricity when moving fluid is supplied.

The invention includes two magnetically coupled, coaxially-nested rotors comprising a magnetic torque transfer assembly: a primary rotor passing through a stator mounted outside a housing, comprising a toroidal series of at least two stator coils, and a secondary rotor mounted to an inner pipe which is attached to a propeller or an impeller having one or more blades. Hereafter, a propeller is any device having one or more blades that displace a fluid when rotated, or when fluid is directed over one or more blades results in rotation of the device. Here the word housing for this and all embodiments may be an enclosure for the stator, enclosure for other components of the invention, or the housing may be nothing more than a frame or lattice for supporting the stator. A toroid herein refers to a circular arrangement of adjacent coils or solenoids having an open core through which a circular rotor may rotate such that both the toroid and the rotor share a common geometric axis of revolution. Individual coils may be circular in cross section, or perhaps square, or any one of a variety of shapes befitting the application. Adjacent stator coils are configured so as to produce opposing magnetic fields upon energizing of the motor. Alternating the current supplied to the stator coils induces movement in the magnetic torque transfer assembly. Commutation can be brushless, or the motor can be configured to function without commutation by varying the frequency of the alternating current, and can be configured to operate by either DC or AC current. Alternatively, the rotor may be driven to generate an electric current in the stator.

One embodiment of the pump and turbine utilize a stator configuration and controller programmed for rolling biphasic coil control, induction torque transfer via magnetic induction and a passive magnetic bearing employing a reluctance magnetic levitation system. Electric energy input turns the magnetically coupled rotors of the motor, and torque is transferred to an inner pipe through an attached copper cylinder inserted between the coaxial magnet rotors. The same pump design may be used to generate electric energy by transferring torque from the copper cylinder attached to the inner pipe and propellers to the magnetic torque transfer assembly and stator.

Rolling biphasic motor control includes dividing motor coils into increments, then energizing groups of contiguous increments into virtual coils, which revolve in tandem with the coupled magnet rotors so to achieve continuous and optimal torque.

The pump/turbine may employ a passive magnetic bearing, which retains the inner pipe in a selected axial displacement range by magnetic coupling between a circular magnet and one or more magnet arrays. Each magnetic coupling completes a magnetic circuit. The magnet arrays focus magnetic flux towards the circular magnet to facilitate magnetic coupling. Magnet arrays configured in Halbach series may be employed. Magnet arrays configured as electromagnets may also be employed. The inner pipe may be attached either to the circular magnet or the magnet arrays. In either case, inner pipe rotation does not affect the magnetic circuit, but axial displacement of the shaft disrupts the magnetic circuit and increases magnetic reluctance thus inhibiting axial displacement. Whether functioning as a pump or a turbine, the inner pipe thereby supports an axial load while rotating freely, constrained to a selected position by forces of magnetic reluctance. A bearing may be employed between the inner pipe and housing to facilitate inner pipe rotation, and this bearing may be a fluid bearing.

Another embodiment is disclosed in which the magnetic torque transfer assembly not only serves to generate and receive torque but also serves as part of a bearing assembly to limit the displacement of the secondary rotor and its attached components relative to the primary rotor. In this embodiment, the primary rotor attaches to a mechanical bearing, either within the stator or external to the stator, so as to achieve both axial and radial stabilization of the primary rotor when acted upon by displacement forces incumbent upon the magnetically coupled secondary rotor. This embodiment typically does not utilize a passive magnetic bearing.

A configuration of this embodiment may serve as a propulsion device when mounted to a boat, in which case water would be drawn into one end of housing 137 and propelled out the other end. The housing in this and all embodiments can be any shape or configuration that has the primary function of supporting the stator. An alternate configuration might also be employed as an electric jet engine when mounted to a flying machine, wherein air is drawn in one end of a housing and forced out the other end of housing, the length of which may be short for vertical take off and landing aircraft. The resultant displacement of fluid mass in one direction causes propulsion of a vehicle attached to the present invention in the opposite direction.

The same device may also be employed to generate hydroelectric power using a gravity-fed flow of water, or by towing an embodiment behind a boat. Wind energy generation is also possible using an embodiment configured to receive the flow of wind or gaseous exhaust from a moving vehicle.

The purpose of the foregoing summary is to enable the public, and especially the scientists, engineers, and practitioners in the art who are not familiar with patent or legal terms or phraseology, to determine quickly from a cursory inspection, the nature and essence of the technical disclosure of the application. The summary is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

BRIEF DESCRIPTION OF PREFERRED EMBODIMENTS

DETAILED DESCRIPTION OF PREFERRED EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

In order that the invention may be more fully understood, it will now be described by way of example, with reference to the accompanying drawings. Magnetic field line arrows may be depicted as flowing from the north pole to the south pole. As per convention well known to those familiar with the art, a small circle with a central dot indicates a magnetic north, while an "x" designates magnetic south.

Figure 1:
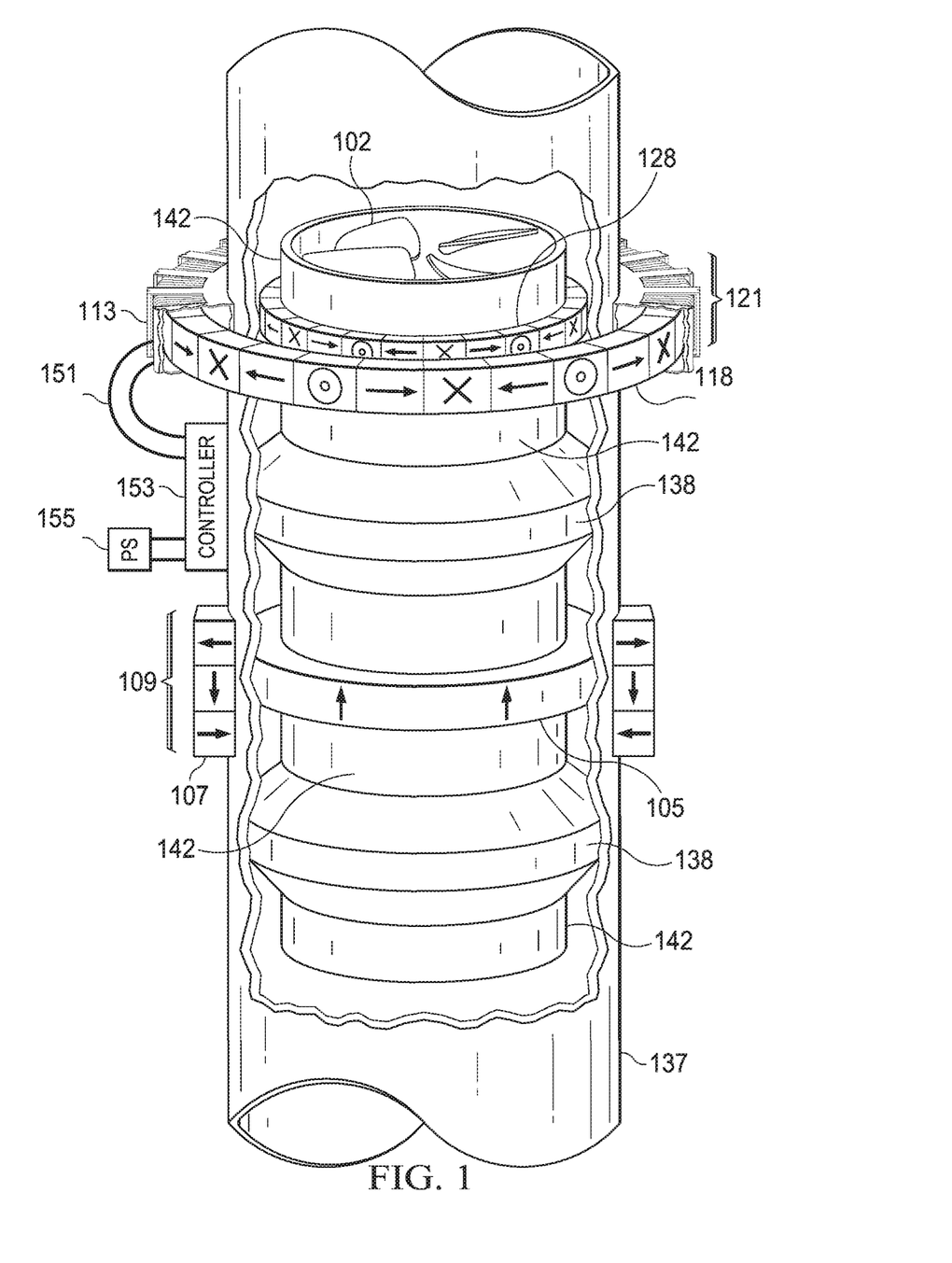
FIG. 1 is a perspective view of one embodiment a magnetic drive axial-flow pump and turbine.

FIG. 1 shows an embodiment of a magnetic torque transfer device. The design of a pump may be identical to a turbine, but the objective of a pump can be thought of as the reverse of a turbine. An electric pump may be defined as a machine designed to convert electricity into the kinetic energy of a moving fluid, while a turbine may be defined as a machine which converts the kinetic energy of a moving fluid into electrical energy. The principle of design of the present invention applies to either, and employs the axial displacement of fluid particles as the medium of energy exchange between kinetic energy of a moving fluid and electricity.

The embodiment of a pump/turbine shown in FIG. 1 has a cylindrical housing 137 for the transfer of fluids such as water or a gas, though the housing in this and all embodiments may be any shape or configuration serving the main function of stator support. The housing may be nothing more than a frame, or it may be an enclosure. Inner pipe 142 is nested within housing 137 and provides a means of operationally connecting propeller 102 to secondary rotor 128. The housing and the inner pipe share a common geometric axis. A propeller 102 has 4 blades extending inwardly, each attached to inner pipe 142. The propeller may also be an impeller, and the number of blades and the angle of the blades will depend on the application, and may vary accordingly. Propeller blades 102 may be attached to each other in the center or open in the center, or attached to the inner wall of inner pipe 142, or attached both at the center and at to inner pipe 142.

Inner pipe 142 is held in axial position by passive magnetic bearing 109 comprising ring magnet 105 and a plurality of magnet arrays 107. This passive magnetic bearing is described in greater detail in U.S. patent application Ser. No. 14/523,687, filed Oct. 24, 2014, which issues as U.S. Pat. No. 10,125,814 on Nov. 13, 2018. It should be understood that an embodiment in which magnet arrays 107 are attached to inner pipe 142, and wherein ring magnet 105 is attached to housing 137, is entirely within the scope of the present invention as elaborated in parent patent U.S. Ser. No. 10/125,814.

Optional passive magnetic bearing 109 prevents inner pipe 142 or propeller 102 from shifting axially relative to housing 137 when propeller 102 is induced to rotate by motor 121, which may be a permanent magnet motor and generator, discussed in U.S. Pat. No. 9,876,407, with the improvements outlined in U.S. patent application Ser. No. 15/878,236.

Bearing 109 is optional, as it is also within the scope of the present invention that a plain bearing or rolling-element bearing positioned to prevent axial and radial displacement of primary rotor 118 within stator 113 would also serve to limit axial displacement of secondary rotor 128 attached to propeller 102.

Motor controller 153 receives power from power repository PS 155 and supplies current to motor 121 via wires 151. Power repository PS 155 may be any energy storage device which may be used to both receive and/or distribute electric energy. Examples of PS 155 would include a national or regional electric power grid. Motor controller 153 may be configured for alternating or multiphase current as described in U.S. Pat. No. 9,876,407, or for rolling biphasic stator control, as disclosed in Ser. No. 15/878,236.

Optional collar 138 attached to inner pipe 142 diverts fluid between collar 138 and the inner wall of housing 137 thus creating a cushion of fluid or a fluid bearing between rotating collar 138 and the inner side of housing 137, and may serve as a centering bearing for the passive magnetic bearing.

The depicted motor/alternator 121 utilizes a toroidal stator 113 attached to the exterior of housing 137, a ring-shaped primary rotor 118 that rotates within the air cores of the coils comprising stator 113, and a secondary rotor 128 magnetically coupled to primary rotor 118. The magnetic torque transfer assembly thus has a primary rotor 118 and secondary rotor 128. These rotors have permanent magnets configured so that each permanent magnet has a magnetic polarity that is 90 degrees offset from each adjacent permanent magnet and 180 degrees offset from each second adjacent permanent magnet so that half of the permanent magnets in each rotor have radial polarities alternating with the other half having circumferential polarities. Note that the radially-directed magnets of the primary and secondary rotors align. These aligned radial magnets have magnetic flux nodes which allow the flow of magnetic flux between primary and secondary rotors, and thus constitute points of magnetic attachment necessary for torque transfer.

Controller 153 supplies alternating current that energizes stator 113 thus inducing rotation of the magnetic torque transfer assembly. Magnetic flux between the coupled rotors flows unencumbered across housing 137, which is constructed of nonmagnetic material such as plastic of fiberglass. The rotation of rotor 128 attached to inner pipe 142 in turn causes rotation of propeller 102, thus inducing the flow of fluid.

Alternatively, when functioning as a turbine, fluid flowing down housing 137 induces rotation of propeller 102 operationally attached to secondary rotor 128 by inner pipe 142. Other means of attachment between propeller 102 and secondary rotor 128 are certainly possible and within the scope of the present invention. The resultant torque is transferred magnetically from secondary rotor 128 across housing 137 to primary rotor 118. Rotation of primary rotor 118 within stator 113 results in the generation of alternating current by motor/alternator 121. The turbine controller may be configured for rolling biphasic coil control to optimize the generation of wind or hydroelectric power.

Figure 2:
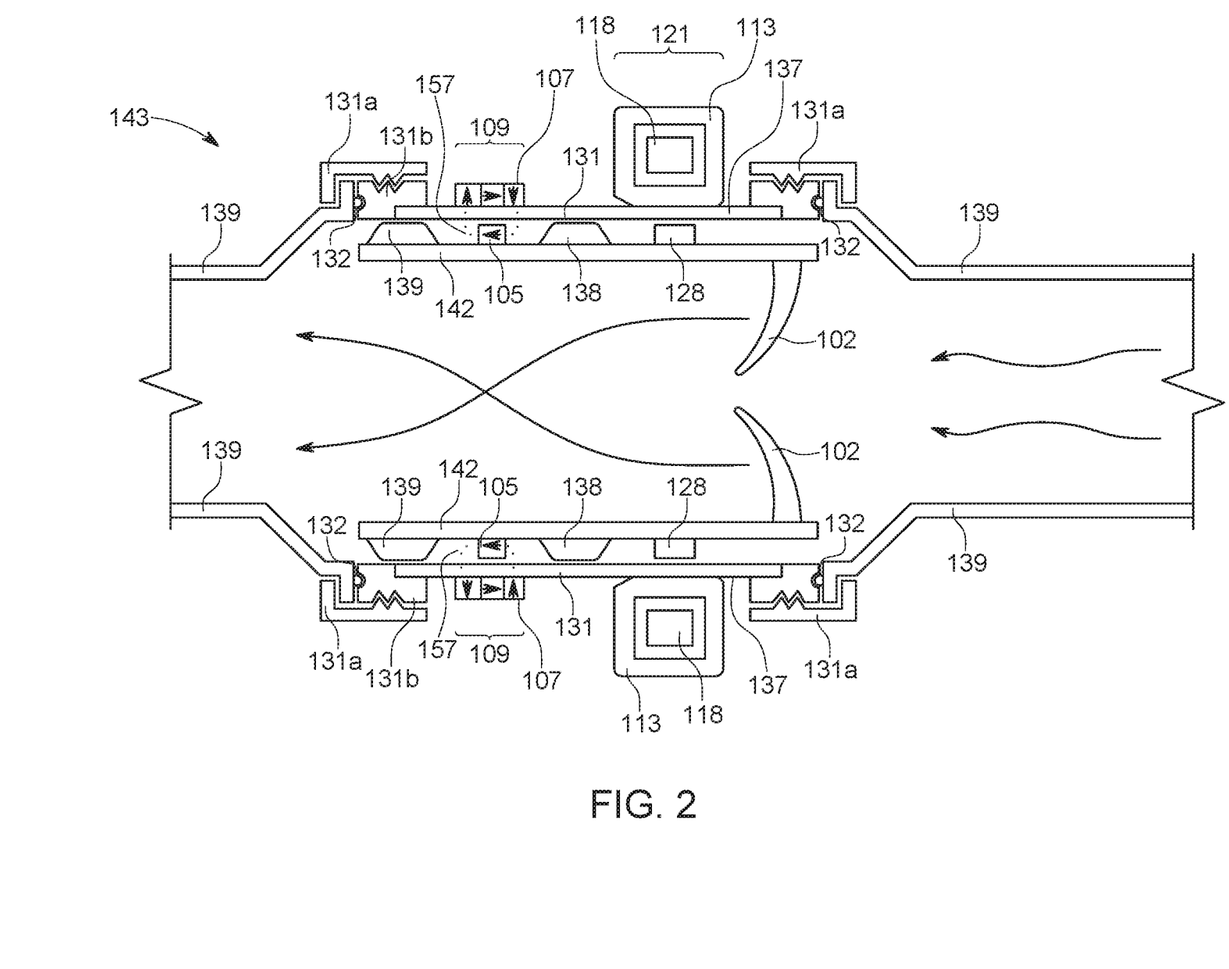
FIG. 2 is a side view schematic of one embodiment a magnetic drive axial-flow pump and turbine.

FIG. 2 of a side view of a second embodiment. Motor/alternator 121 has stator 113 attached to the exterior of housing 137, a primary rotor 118 that rotates within stator 113, and a secondary rotor 128 magnetically coupled to primary rotor 118. Alternating current from will energize stator 113 and induce rotation of primary rotor 118 coupled to secondary rotor 128. This magnetic coupling allows transfer of torque between primary rotor 118 and secondary rotor 128 across housing 137. The rotation of rotor 128 attached to inner pipe 142 causes rotation of propeller 102, thus inducing the axial flow of fluids. Note in this embodiment that propeller 102 has blades that are attached to inner pipe 142 but not attached to each other at the center, though a center point of attachment of blades 102 is well within the scope of the present invention.

The same embodiment disclosed in FIG. 2 may also function as a turbine, in which case fluid flowing through housing 137 induces rotation of propeller 102 attached to secondary rotor 128. The resultant torque is transferred magnetically from secondary rotor 128 across housing 137 to primary rotor 118. Rotation of primary rotor 118 within stator 113 results in the generation of alternating current by motor/alternator 121. Stator 113 may be configured for rolling biphasic coil control to optimize power generation.

Inner pipe 142 is held in axial position by optional passive magnetic bearing 109 comprising magnet array 107 attached to housing 137 and ring magnet 105 attached to inner pipe 142. The dotted lines 157 linking magnet array 107 to ring magnet 105 signify magnetic flux lines. The arrows signify magnetic polarity of individual magnets. The arrow points to magnetic north.

Note that the arrows in magnet array 107, the dotted flux lines, magnet array 107, and ring magnet 105 complete a circular magnetic circuit. This magnetic circuit invokes a form of magnetism known as magnetic reluctance. Whereas typical magnetism involves simple magnetic attraction or repulsion, the forces of magnetic reluctance refer specifically to magnetic flux circuits and the forces required to disrupt these circuits.

Bearing 139 attached to inner pipe 142 diverts fluid between bearing 139 and the inner wall of housing 137 thus creating a fluid bearing between rotating inner pipe 142 and housing 137.

A threaded assembly has o-ring 132, threaded ring coupler 131a, and threaded receiver 131b glued or otherwise attached to main pipe 137. This threaded assembly provides a means of installing the Magnetic Torque Transfer Device within optional fluid line 139.

Figure 3:
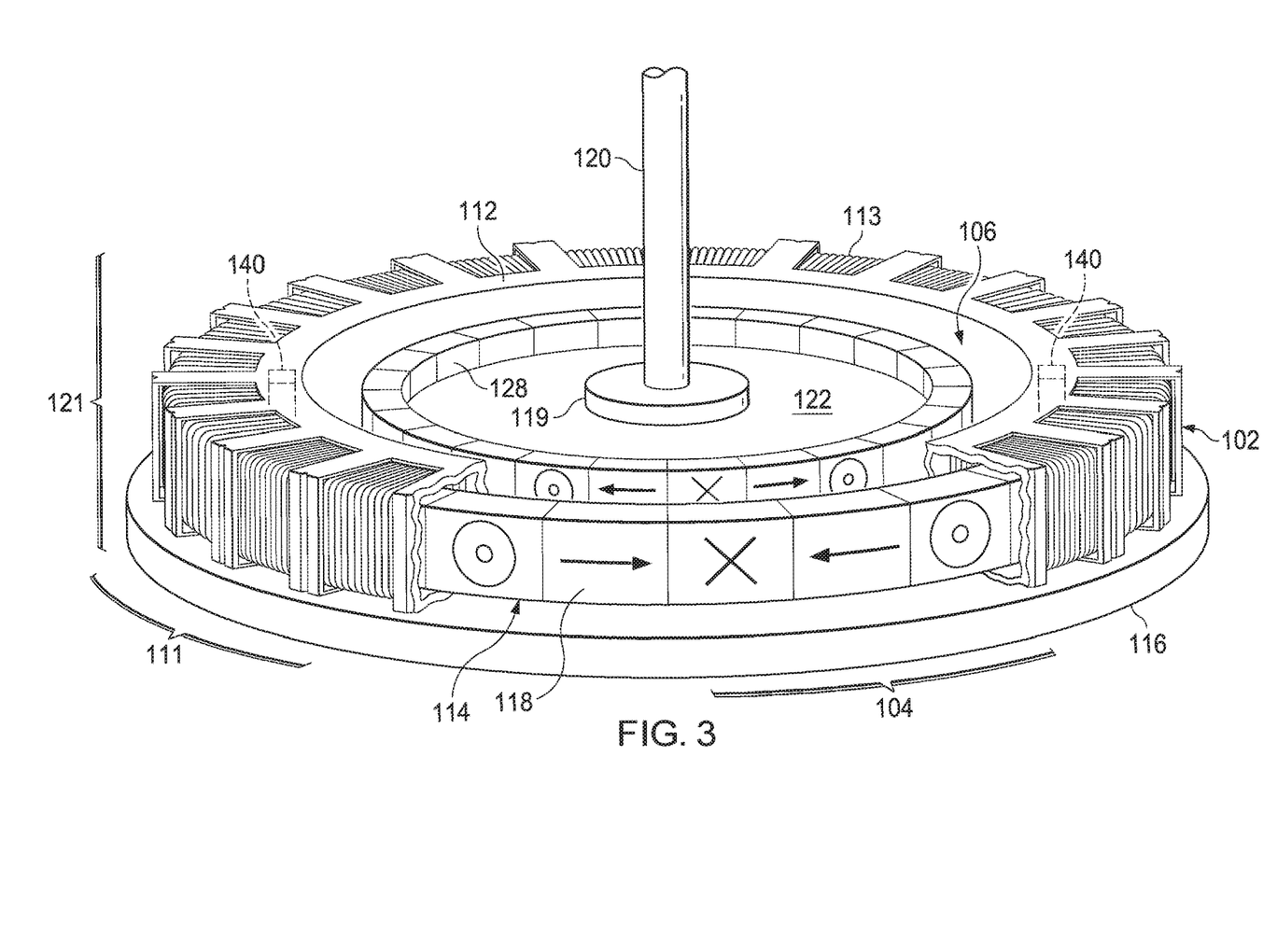
FIG. 3 is perspective view and cut away of a permanent magnet motor and generator.

FIG. 3 exemplifies a type of motor/alternator for providing a rotatory driving force to a shaft, wherein it is to be understood that the shaft may be solid or it may be a hollow pipe, and are described in greater detail in co-pending patent application Ser. No. 15/878,236 filed Jan. 23, 2018, incorporated herein by reference in their entireties.

Motor/alternator 121 has a primary rotor 118, which is positioned for free rotation within stator 113 held within a coil frame 112. Stator 113 has a hollow toroid shaped series of coils. Coil group 111 has three equal coil configured such that the coils in each coil group generate electric fields of the same polarity and each pair of adjacent coil groups generate opposing polarities. Coil groups have two or more coils per group. Stator 113 may thus be configured for rolling biphasic coil control.

Secondary rotor 128 is attached to rotor plate 122. Shaft 120 may also take the form of a pipe or tube attached directly to inner magnet rotor 128, or any shape compatible with the mechanical transfer of torque. Axial magnet 114 on primary rotor 118 is oriented such that its north magnetic pole is directed away from the geometric axis of rotation about which rotates shaft 120, and aligns with a similarly oriented axial magnet on secondary rotor 128 such that magnetic coupling occurs between these two axial magnets.

Energizing stator 113 urges primary rotor 118 to rotate, generating torque. This torque is transferred magnetically to secondary rotor 128 across gap 106 resulting in the rotation of shaft 120. Position sensor 140 feeds positional information to a motor controller (not shown).

Figure 4A:
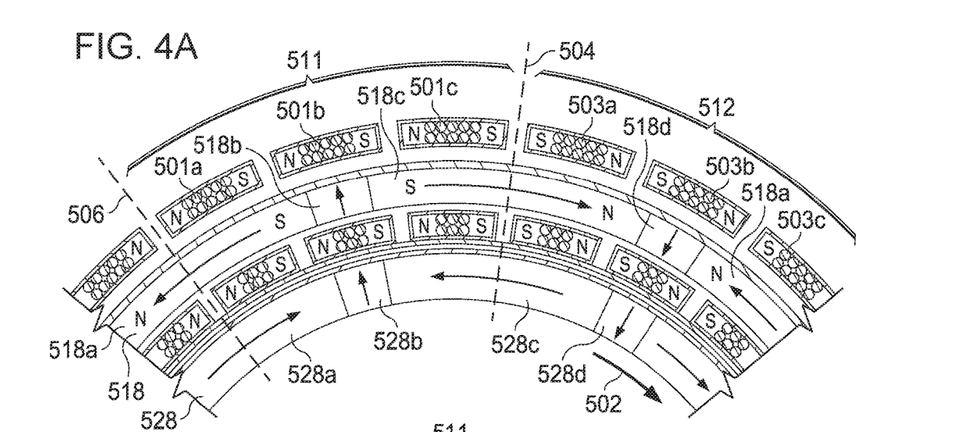
FIG. 4a is a schematic of a rotational sequence of one embodiment of a motor configured for three-phase alternating current, or for rolling biphasic coil control in a first position.

Three-phase motor operation may be understood by examining FIG. 4A. The stator has coil groups of three contiguous coils. Coils 501a, 501b, and 501c have one group, and coils 503a, 503b, and 503c have an adjacent coil group. This configuration allows for the application of three-phase alternating current to three separate circuits each offset by 120 degrees. Coils 501a and 503a are configured on a first circuit, coils 501b and 503b are configured on a second circuit, and coils 501c and 503c are configured on a third circuit. This three-phase configuration creates a revolving magnetic field that does not require auxiliary mechanisms to initiate rotation from a dead stop, and could be arranged in a delta or wye circuit.

Figure 4B:
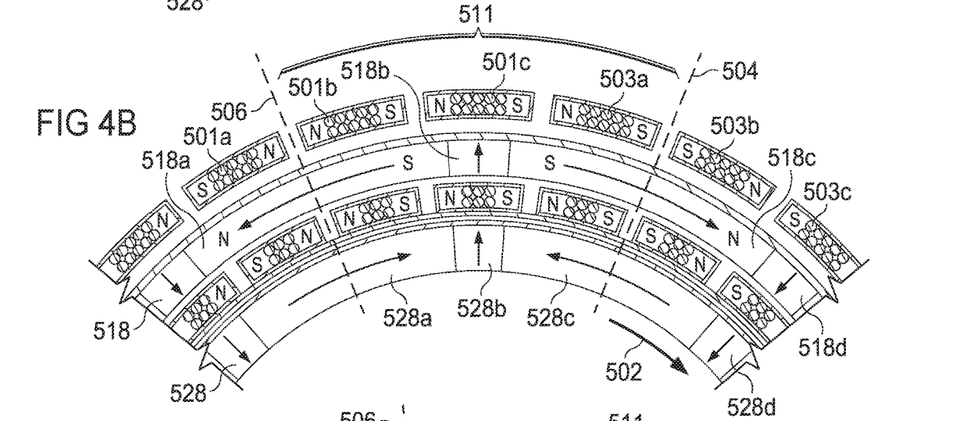
FIG. 4b is a schematic of a rotational sequence of a motor configured for rolling biphasic coil control in a second position.
Figure 4C:
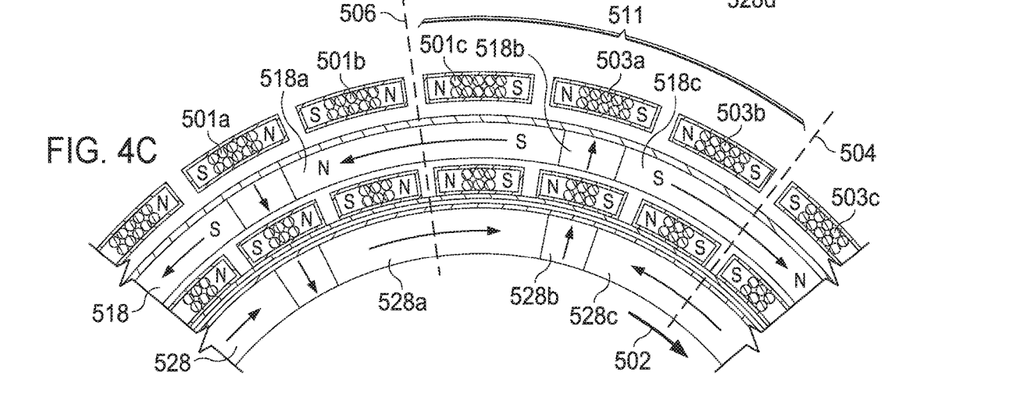
FIG. 4c is a schematic of a rotational sequence of a motor configured for rolling biphasic coil control in a third position.

FIGS. 4A-4C illustrate a novel form of motor control called Rolling Biphasic Coil Control (RBCC), which increment coils are energized into groups as described in detail in co-pending patent application Ser. No. 15/878,236. Coil groups are assigned by the motor controller to emulate an equivalent larger or virtual coil. A virtual coil has a group of adjacent coils each generating a magnetic field of the same polarity, and having the opposite polarity of the next adjacent virtual coil so as to emulate a large coil having a length equal to the sum of the lengths of the increment coils within a coil group. As the rotor rotates, its position is sensed by a sensor which continuously updates the controller, which continuously reconfigures coil groups to align with circumferential magnets on the primary rotor such that one circumferential magnet lies half with one coil group and half within an adjacent coil group to facilitate optimal torque between stator and rotor and eliminate torque ripple.

The RBCC configuration illustrated in FIG. 4A creates two coil groups 511 and 512, each with three equal coil increments designated 501a-501c and 503a-503c respectively. These coil groups are temporary, and have three adjacent coil increments all energized with the same polarity. The maximum repulsive force of coil group 511 on rotor magnet 118c occurs when coil group 511 is bounded on the left by radius 506, passing through magnet center 518a, and bounded on the right by radius 504, passing through magnet center 518c. Concomitantly, coil group 512 exerts the maximum attractive force on the same rotor magnet 118c in this rotor position. Thus coil group 511 pushes circumferential rotor magnet 518c while coil group 512 pulls on the same rotor magnet so that forces from each coil group synergize to urge primary rotor 518 in a clockwise rotational direction.

Coil groups are continuously reconfigured by a controller so as to align with radii 504 and 506, which rotate clockwise with the primary rotor 118. This rotation causes circumferential magnet 518c and its radius 504 to rotate away from the point of optimal force between coil groups 511 and 512 in FIG. 4A to a new position as shown in FIG. 4B. The controller now reconfigures coil group 511 to now has adjacent coil increments 501b, 501c, and 503a, each having the same N/S polarity. Physically, the position of these coil increments hasn't changed, only the coil grouping. Magnet 503a switched from having a S/N polarity in FIG. 5A to having a opposite N/S polarity in FIG. 5B. Likewise, coil increment 501a switched from a N/S polarity in FIG. 4A to the opposite S/N polarity in FIG. 4B. Coil group 512 in FIG. 4B has also been reconfigured as shown. This reconfiguration of coil groups allows that rotor magnet 518c once again straddles two coil groups, and thus continues to experience optimal electromotive force.

Further rotation of primary rotor 518 in FIG. 4C demonstrates a new coil group configuration that has rolled clockwise in tandem with the primary rotor. Coil group 511 now has coil increments 501c, 503a, and 503b, which all have the same N/S polarity.

In each of FIGS. 4A, 4B and 4C, the coil increments have been selectively energized in rolling fashion so as to maintain primary rotor magnets in a position of optimal electromotive force in relation to the coil groups.

The relationship between the stator, comprising adjacent coil groups, and the magnetic torque transfer assembly, comprising primary rotor 118 and secondary rotor 128, may be stated geometrically. Each coil group may be defined as extending through a predetermined arc from a radius passing through radius 504 to a radius passing through radius 506. The angle of this arc is substantially equivalent to the angle of the arc described by the borders between each coil group, and the angle of the arc between the centers of two next adjacent primary rotor circumferential magnets.

While coils 501a-c and 503a-c have been exemplified as divided into three equal coil increments, it is understood that these coils could be divided into any number of equal coil increments as desired and still operate in accordance with principles of the present invention. In fact, the greater the number of coil increments per virtual coil group the greater the energy efficiency and the less the torque ripple.

Figure 5:
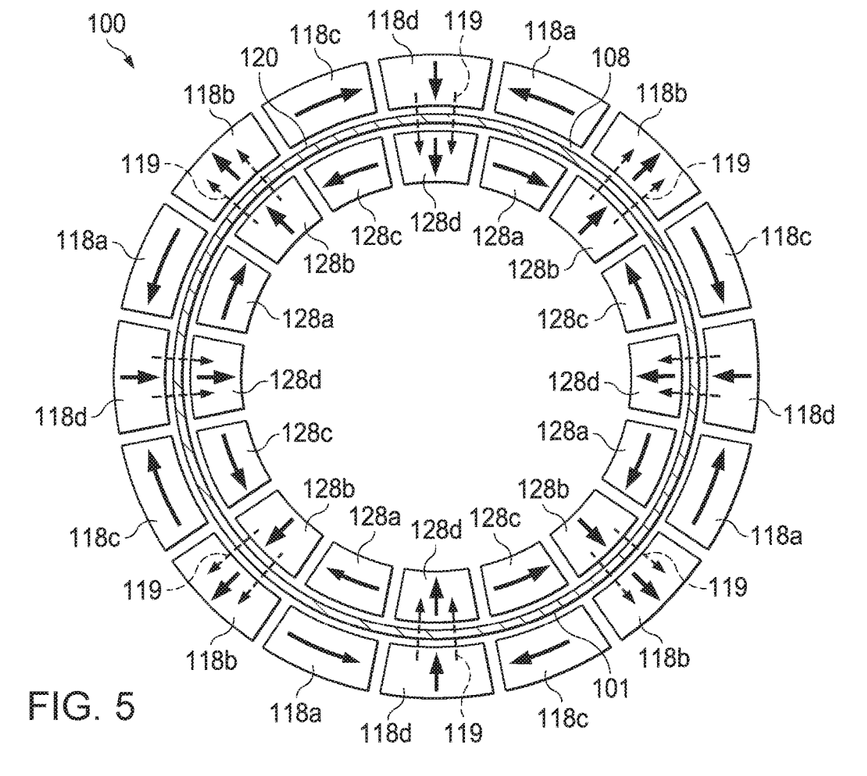
FIG. 5 is a schematic representation of an inner secondary rotor coupled to an outer primary rotor with an induction cylinder within the gap between the rotors.
Figure 6:
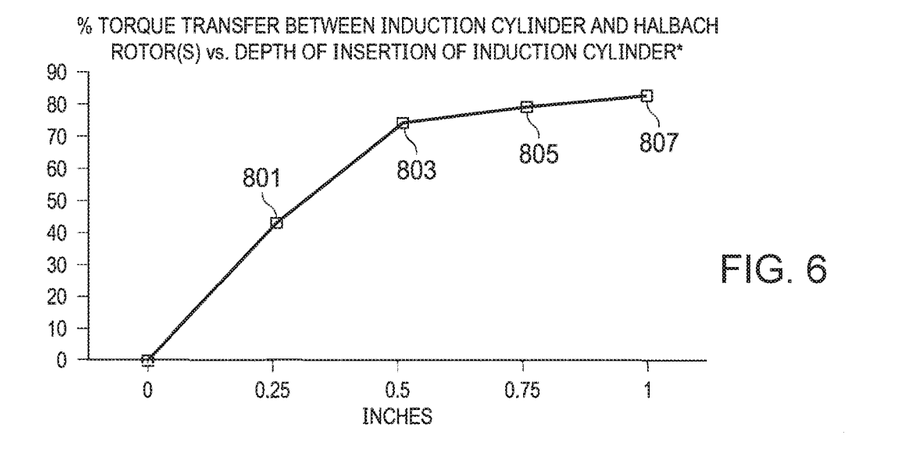
FIG. 6 is a graphic representation of percent torque transfer versus depth of insertion of an induction cylinder into the gap between primary and secondary rotors.

The Magnetic Drive Axial-flow Pump and Turbine may employ a second method of magnetic torque transfer within the magnetic torque transfer assembly as described in U.S. Pat. No. 9,876,407, which is included here for reference. FIGS. 5 and 6 described a continuation or evolution of direct magnetic torque transfer. This evolution is called magnetic induction torque transfer (MITT), and involves the insertion of an induction cylinder, fabricated from electrically conductive material, into the gap between the primary and secondary rotors. Like direct magnetic torque transfer, MITT is a form of magnetic torque transfer. However, MITT transfers torque via magnetic fields induced in a cylinder fabricated from copper, aluminum, or some other electrically conductive material in accordance with Lenz's Law of Induction.

Referring to FIG. 5 of the drawings, primary rotor 118 is magnetically coupled to secondary rotor 128. The magnetic coupling occurs at various points around each array as exemplified by magnetic flux lines 119. Magnetic coupling between the inner and outer rotors results in a transfer of torque between the inner and outer rotors. Accordingly, when one rotor 118 or 128 is urged to rotate, the other array also rotates as the arrays are magnetically coupled.

Magnetic induction torque transfer represents an evolution of magnetic torque transfer method disclosed in copending patent application Ser. No. 15/878,7836 filed Jan. 23, 2018, incorporated herein in its entirety. The MITT method recruits the strong magnet fields between rotors 118 and 128 in an application of Lenz's law, which describes the magnetic attraction induced when an electric conductor is placed in a moving magnetic field.

A magnetic cylinder 120 is interposed between rotors 118 and 128. Magnetic induction cylinder 120 is fabricated from an electrically conductive material, such as copper or aluminum. When magnetic induction cylinder 120 is at rest relative to the coupled rotors 118 and 128, no force exists on the magnetic induction cylinder 120. Movement of magnetic induction cylinder 120 relative to coupled rotors 118 and 128 generates an electrical current within magnetic induction cylinder 120, in accordance with Lenz's law of induction. The electrical current, contained completely within the conductor, induces a magnetic field of its own. The induced magnetic field contained within the magnetic induction cylinder 120 results in a magnetic attraction, and torque transfer, between the magnetic induction cylinder 120 and the coupled rotors 118 and 128, resulting in torque transfer. The MITT method of torque transfer between magnetic induction cylinder and coupled magnetic arrays is completely novel.

The outer rotor 118 and the inner rotor 128 may be a pair of double-nested coaxial Halbach cylinders, well known to those skilled in the art. It should be understood, however, that the scope of the disclosed invention is not limited to the Halbach cylinder, and is meant to include any configuration of one or more coaxial magnet rotors that are coupled so as to create magnetic field lines that pass through a magnetic induction cylinder fabricated from conducting material.

It should be apparent to one skilled in the art that the function of the magnetic arrays 118 and/or 128 is to generate a magnetic field that produces a force when sufficiently proximate to a magnetic induction cylinder of conducting material as per Lenz's law. Strictly speaking, either the outer rotor 118 or the inner rotor 128 would alone be sufficient to transfer torque to magnetic induction cylinder 120 across a small enough gap if the magnetic fields were sufficiently strong. One benefit to having magnetic induction cylinder 120 rotate within the gap between magnetically coupled cylinders, however, is that the requisite gap need not be quite as stringently small.

With reference to FIG. 6, experimentation has shown that when the magnet rotors 118 and 128 are rotated relative to magnetic induction cylinder 120 (e.g., at 3,240 RPM per FIG. 2), torque is transferred between magnetic induction cylinder 120 and magnet rotors 118 and 128. The degree of torque transferred depends upon the degree to which magnetic induction cylinder 120 is lowered into a one inch gap between outer rotor 118 and inner magnet rotor 128.

Magnetic induction cylinder 120 has a height sufficient to enter the full depth of the gap between magnet rotors 118 and 128. Per the experimental parameters, this depth is 1 inch. At a depth of ¼ inch, about 40% of torque from magnet rotors 118 and 128 is transferred to magnetic induction cylinder 120, as indicated by data point 201 on FIG. 2. When magnetic induction cylinder 120 is lowered to a depth of 0.5 inch, the transfer of torque increases to over 70%, as per data point 203 on FIG. 2. When magnetic induction cylinder 120 is lowered to a depth of 0.75 in, the transfer of torque increases to over 80% as per data point 205 on FIG. 2. When magnetic induction cylinder 120 is lowered one into the gap between rotors 118 and 128, the full depth of insertion, the transfer of torque increases to over 80% as per data point 207 on FIG. 2.

Figure 7:
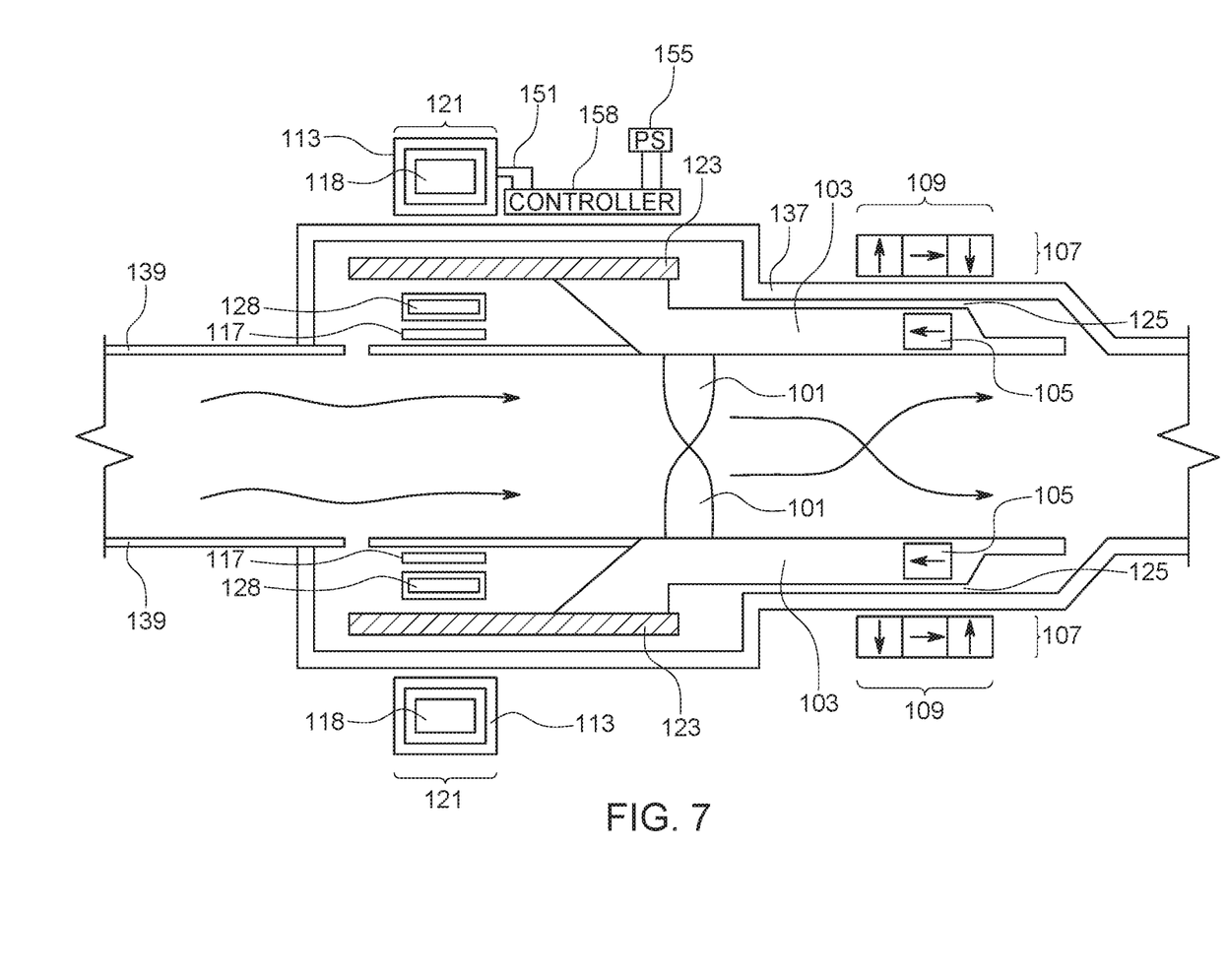
FIG. 7 is a side view of one embodiment of a magnetic drive axial-flow pump and turbine employing induction torque transfer.

The embodiment of the present invention shown in FIG. 7 represents an application of magnetic induction torque transfer (MITT) and rolling biphasic coil control. A cross-section through permanent magnet motor and alternator 121 has a stator coil 113. Within this stator there is a tunnel through which rotates primary rotor 118. Secondary rotor 128 is attached rotated to cylindrical bearing 117 which is attached to inner pipe 103. Cylindrical bearing 117 enables free rotation of secondary rotor 128 relative to inner pipe 103. Primary rotor 118 is magnetically coupled across housing 137. Housing 137 is made of non-magnetic material such as fiberglass or plastic. Magnetic flux between coupled rotors 118 and 128 passes through magnetic induction cylinder 123. Energizing stator 113 will urge rotation of coupled primary rotor 118 couple to secondary rotor 128 creating a rotating magnetic field between them. Magnetic induction cylinder 123 directly experiences this rotating magnetic field and is induced to rotate in accordance with Lenz's law as described in greater detail above.

As is well understood by those skilled in the art, the rotational rate of primary rotor 118 coupled to secondary rotor 128 will exceed the rotational rate of induction cylinder 123 when this embodiment of the present invention is functioning as a fluid pump or fan. Conversely, when this embodiment of the present invention functions as a turbine, fluid such as water or air moving through housing 137 urges rotation of propeller 101 causing rotation of attached magnetic induction cylinder 123, which according to Lenz's Law will transfer torque to coupled rotors 118 and 128. Primary rotor 118 moving through stator 113 will generate electricity when appropriately controlled by controller 158. In turbine mode, the magnetic induction cylinder 123 rotational rate will exceed the rotational rate of the coupled rotors 118 and 128. In order to invoke Lenz's Law, whether in turbine mode or pump mode, there must be relative motion between coupled rotors and magnetic induction cylinder.

Magnetic induction cylinder 123 is attached to inner pipe 103, within which are attached propeller blades 101, which are operationally attached to induction cylinder 123 by inner pipe 103. Note that these blades are attached to each other in the middle as well as to inner pipe 103. The exact shape of the propeller, including the angle of attack, number of blades, points of attachment, etc., will vary according to application, and FIG. 7 only illustrates one of many possible propeller configurations. The propeller may in another embodiment has an impeller and still fall within the scope of the present invention.

Inner pipe 103 is magnetically attached to housing 137 by means of a magnetic bearing 109, which has circular magnet 105 which forms a magnetic circuit with the magnet arrays 107. This magnetic circuit invokes forces of magnetic reluctance that resist axial displacement of inner pipe 103 relative to housing 137. Thus ring magnet 105 is not fixed in position relative to magnet arrays 107, but the axial travel is limited to within a predetermined margin that roughly corresponds to the length of a magnet array 107. This implies that magnetic induction cylinder 123 also moves axially within certain limits. Torque transfer between coupled rotors and magnetic induction cylinder will still occur as long as any portion of the magnetic induction cylinder remains in the magnetic flux between coupled cylinders 118 and 128.

Controller 158 receives power from power source 155, and may be programmed to deliver a variety of types alternating current to stator 113 through wires 151. Examples include 2-phase AC, also called simple or stationary biphasic. Stator 113 may also be configured for rolling biphasic stator control (RBSC) as described above. 3-phase operation is also possible.

Electricity may also be generated by magnetic induction torque transfer, which employs a magnetic induction cylinder 123 operationally attached to propeller 101 by inner cylinder 103. Induction cylinder 123 is positioned inside housing 137 and between secondary rotor 128 and a primary rotor 118. When fluid flows through the propeller 101, the attached inner pipe will rotate. Rotation of this inner pipe will also rotate the attached magnetic induction cylinder 123 and induce rotation in the coupled primary/secondary rotors comprising the magnetic torque transfer assembly. Rotation of the primary rotor 118 within the stator 113 will generate electricity.

Figure 8:
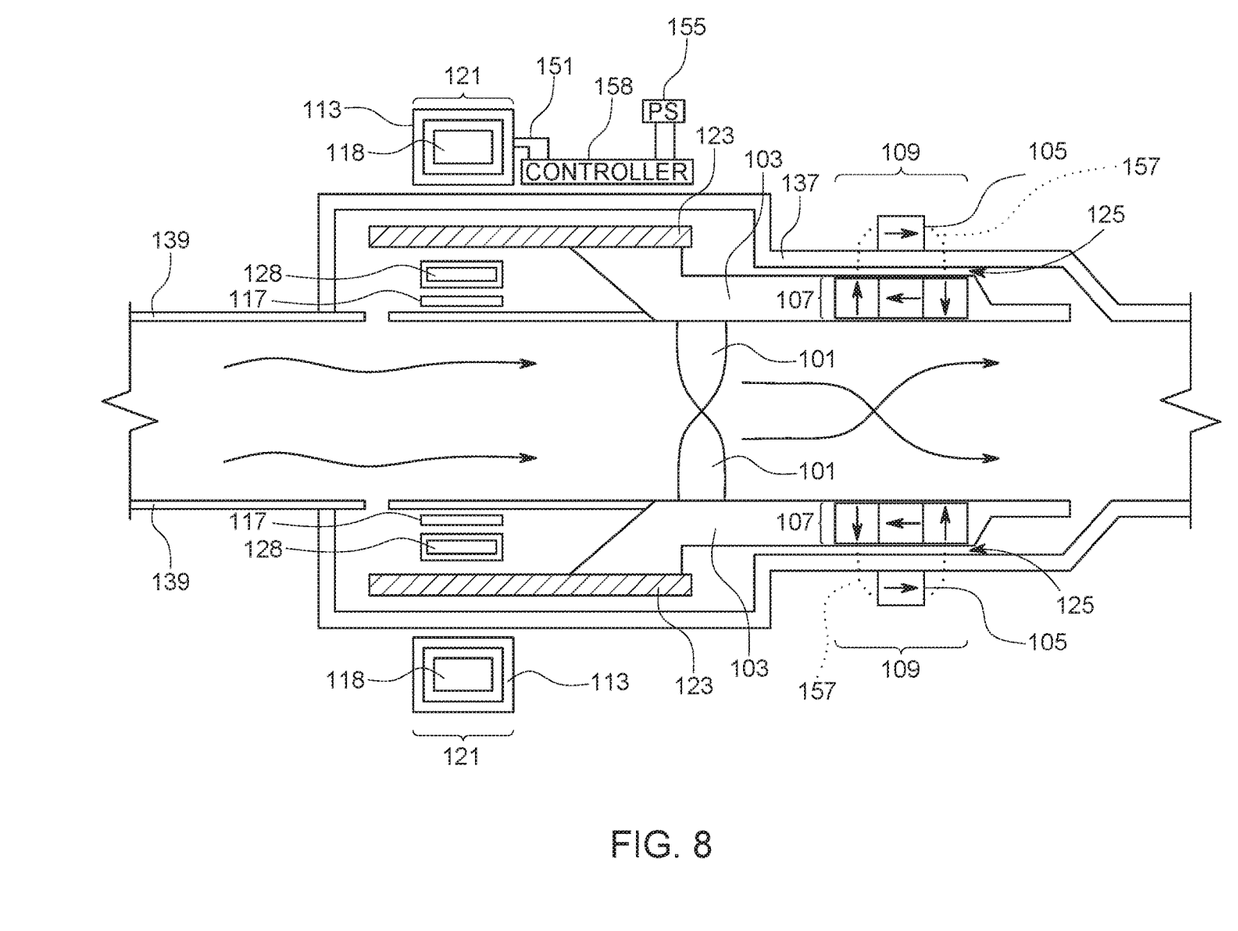
FIG. 8 is a side view of another embodiment of the magnetic drive axial-flow pump and turbine employing induction torque transfer.

Another embodiment of the present invention, shown in FIG. 8, represents another application of magnetic induction torque transfer (MITT) and rolling biphasic coil control. This embodiment is identical in function to the embodiment outlined in FIG. 7, and identical in form except for the configuration of the passive magnetic bearing 109. In this embodiment, the magnet arrays 107 are attached to the inner pipe while the ring magnet 105 is attached to housing 137. Magnetic field lines 157 complete the magnetic circuit comprising magnet arrays 107 and ring magnet 105.

Figure 9A:
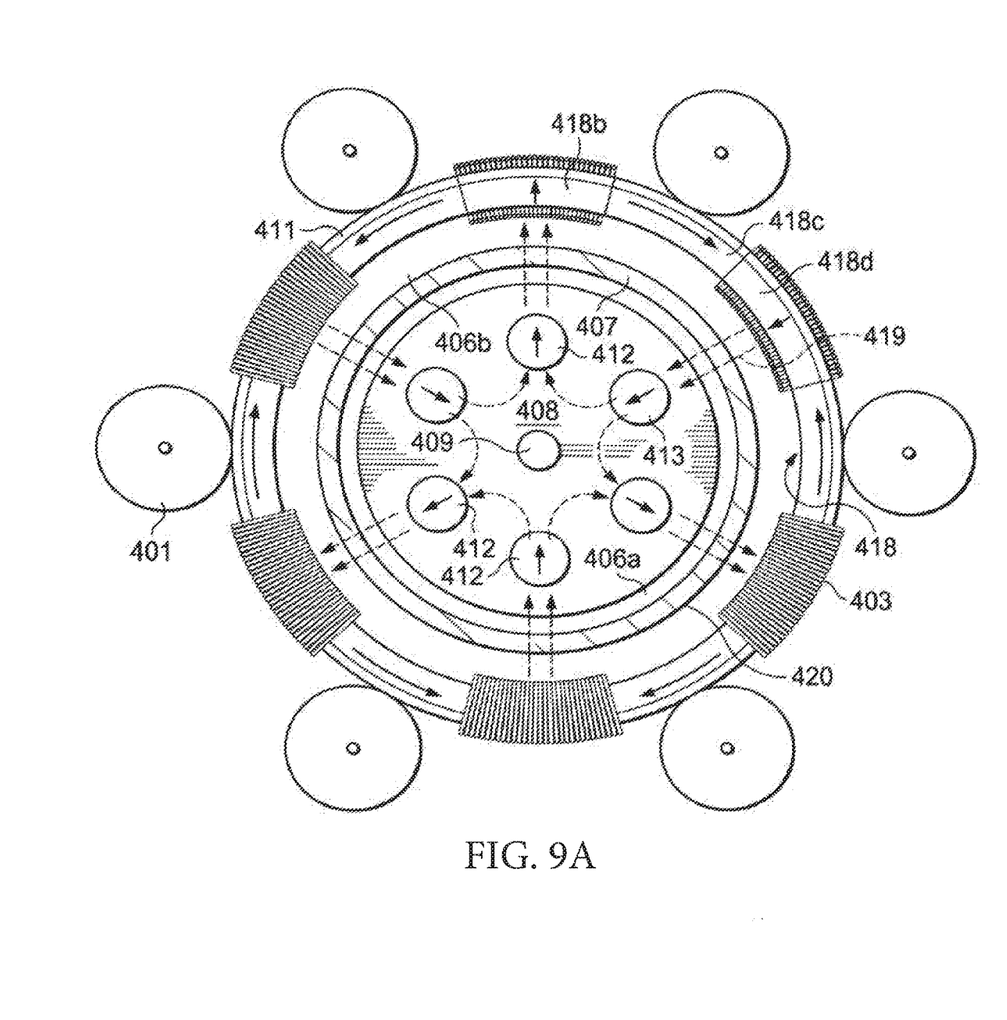
FIGS. 9a. and 9b. are frontal and side illustrations of an embodiment having rolling-element bearings and an alternate configuration for the inner rotor.
Figure 9B:
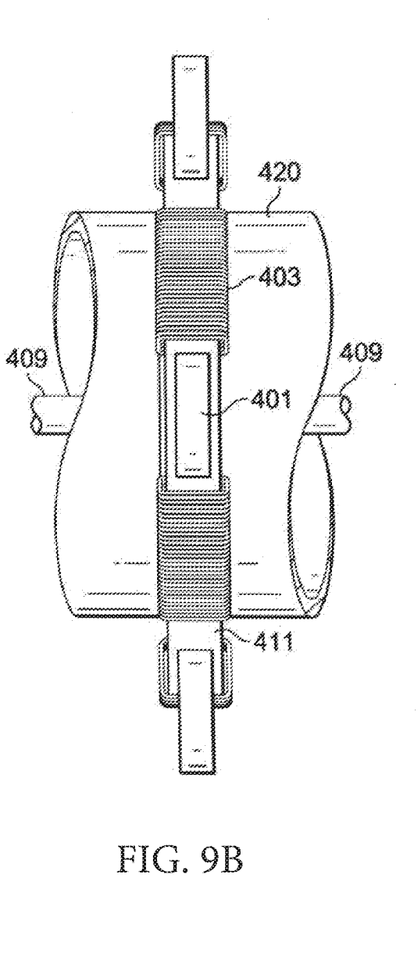

FIG. 9A and FIG. 9B illustrate an alternate method of stabilizing a primary rotor 418 within stator 403 against axial and radial displacement.

Stator 403 has a series of coils positioned in the shape of a toroid such that the air core of each coil allows rotation of primary rotor 418. Interposed within the series of coils is a series of spaces in order to accommodate rolling-element bearings 401. Stator 403 may be configured for rolling biphasic coil control.

A torque assembly has primary rotor 418 and inner rotor assembly 408. Rotor 418 is surrounded by a primary rotor support 411 which provides structural support to primary rotor 418. Outer rotor support 411 also provides a bearing surface for rolling-element bearings 401, which serve to stabilize outer magnet rotor 418 both axially and radially as it rotates within the plurality of coils comprising stator 403. Rolling-element bearings may use cylinders or rollers as the rolling element, or balls or spheres, or any other element that both reduces friction and supports a radial and/or axial load.

Energizing stator 403 urges rotation of outer magnet rotor 418, which is magnetically coupled to inner rotor assembly 408 which rotates about shaft 409. Torque is thereby transferred via the magnetic torque assembly comprising primary rotor 418 and inner rotor assembly 408 across flux lines 419, which pass through magnetic induction cylinder 420.

This embodiment further demonstrates that magnetic coupling and torque transfer may occur between a variety of coaxial magnetic arrays. Although the magnets 412 and 413 within inner rotor assembly 408 alternate in polarity, any configuration of magnets within the inner or outer rotor that results in magnetic flux passing through the magnetic induction cylinder 420 may function to transfer torque.

The embodiment of FIGS. 9A and 9B thus illustrates two possible modes of magnetic torque transfer, which may function concomitantly. Direct or primary torque transfer occurs as a result of the magnetic coupling between primary rotor 418 and inner rotor assembly 408, and subsequently to shaft 409. Simultaneously, magnetic induction torque transfer may also occur as a result of the induced electromotive forces resulting from the effect of magnetic field lines 419 upon magnetic induction cylinder 420 in accordance with Lenz's law of induction. Both modes of torque may occur within the same motor/generator configuration. The rotational rates of either mode are not equal, however, and design accommodations must be made accordingly.

While certain exemplary embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

What is claimed is:

1. A magnetic torque transfer device comprising:
 a housing;
 a stator mounted externally to said housing, said stator comprising one or more adjacent coils positioned end to end and arranged in the shape of a toroid, each of said coils having an air core said stator having a geometric axis;
 the magnetic torque transfer assembly further comprising a primary rotor and a secondary rotor, said primary rotor having a plurality of permanent primary magnets positioned within said stator coaxial with said stator for passing through the air cores of said one or more coils comprising said stator, the plurality of permanent primary magnets having a primary magnetic field, and said secondary rotor positioned external to the stator and inside the housing, said secondary rotor positioned coaxial to said primary rotor, said secondary rotor comprising a plurality of permanent secondary magnets having a secondary magnetic field directed toward the primary rotor and configured to magnetically couple with the primary rotor; and wherein the primary magnetic field is directed toward the secondary rotor and configured to magnetically couple with the secondary rotor, to thereby magnetically transfer torque between the primary rotor and the secondary rotor;
 a sensor positioned to determine the location of said magnetic torque transfer assembly in relation to said stator;
 a controller configured for rolling biphasic coil control, wherein said controller receives positional input from said sensor and uses said positional input to configure said stator into coil groups such that adjacent coils within a first coil group comprise coils having like polarity, and such that adjacent coils within a second coil group comprise coils have polarity opposite the polarity of said first coil group, said first coil group positioned adjacent to said second coil group, with a result that said controller configures said coil groups so as to maintain a magnet center of each primary circumferential magnet at or proximate to a border between said adjacent coil groups.

2. The torque transfer device of claim 1 further comprising an inner pipe attached to said secondary cylinder and coaxial with said secondary cylinder, said inner pipe positioned within said housing for rotation within said housing.

3. The torque transfer device of claim 2 further comprising a propeller, said propeller operationally attached to said secondary rotor.

4. The torque transfer device of claim 1 further comprising a shaft operationally connected to said secondary rotor.

5. The torque transfer device of claim 1 further comprising a passive magnetic bearing operationally attached to said secondary rotor, said passive magnetic bearing comprising at least one permanent circular magnet and at least one permanent magnet array, configured so that said permanent magnet array couples magnetically with said permanent circular magnet in a pincher effect, wherein said at least one permanent magnet array focuses magnetic flux so as to complete magnetic circuits between said magnet array and said circular magnet, with a result that axial displacement of said secondary rotor relative to said primary rotor causes an increase in magnetic reluctance and thereby limits axial displacement of said secondary rotor.

6. The torque transfer device of claim 5, wherein the passive magnetic bearing is further configured so that the at least one permanent magnet array is attached to the housing and the at least one permanent circular magnet is operationally attached to said secondary rotor.

7. The torque transfer device of claim 5, wherein the passive magnetic bearing is further configured so that the at least one permanent circular magnet is attached to the housing and the at least one permanent magnet array is operationally attached to the secondary rotor.

8. The torque transfer device of claim 2, wherein the secondary rotor is rotatably attached to said inner pipe thereby permitting rotation of said secondary rotor relative to said inner pipe, and said inner pipe further comprising an induction cylinder mounted coaxially to said inner pipe, said induction cylinder having a radius larger than said inner pipe, said induction cylinder extending between said primary rotor and said secondary rotor, such that rotation of said magnetic torque transfer assembly relative to said induction cylinder results in torque transfer between said magnetic torque transfer assembly and said induction cylinder, thereby driving rotation of said inner pipe.

9. The torque transfer device of claim 3, wherein the secondary rotor is rotatably attached to said shaft thereby permitting rotation of said secondary rotor relative to said shaft, and said shaft further comprising an induction cylinder mounted coaxially to said shaft, said induction cylinder having a radius larger than said inner pipe, said induction cylinder extending between said primary rotor and said secondary rotor, such that rotation of said magnetic torque transfer assembly relative to said induction cylinder results in torque transfer between said magnetic torque transfer assembly and said induction cylinder, thereby driving rotation of said shaft.

10. The torque transfer device of claim 2 wherein said inner pipe has a fluid bearing, said fluid bearing comprising at least one collar attached to said inner pipe, said fluid bearing configured so that the flow of fluid between said collar and said housing limits radial displacement of said collar and permits rotation of said collar relative to said housing.

11. The torque transfer device of claim 1 further comprising one or more bearings configured to constrain rotation of said primary rotor within said stator.

12. The torque transfer device of claim 11 in which said one or more bearings comprise a plain bearing.

13. The torque transfer device of claim 11 in which said one or more bearings comprise rolling-element bearings.

14. The torque transfer device of claim 13 in which said one or more adjacent coils are positioned for spacing between said coil groups, and said one or more bearings are positioned substantially exterior to said stator.

15. A fluid displacement device comprising:
a housing configured for the transfer of fluid through said housing;
a passive magnetic bearing comprising at least one permanent circular magnet and at least one permanent magnet array, configured so that said permanent magnet array couples magnetically with said permanent circular magnet in a pincher effect, wherein said at least one permanent magnet array focuses magnetic flux so as to complete magnetic circuits between said magnet array and said circular magnet, with a result that axial displacement of said inner pipe relative to said housing causes an increase in magnetic reluctance and thereby limits axial displacement of said inner pipe;
a motor configured to rotationally drive said inner pipe, wherein said motor has a stator, said stator comprising a plurality of adjacent electric coils arranged in the shape of a toroid, said stator mounted externally to the housing, said motor further comprising a torque transfer assembly that comprising a rotor assembly, wherein said rotor assembly comprising a primary rotor and a secondary rotor, said primary rotor having a plurality of permanent primary magnets positioned within the stator for passing through the stator, the plurality of permanent primary magnets having a primary magnetic field, and said secondary rotor positioned external to the stator and inside the housing, said secondary rotor attached to the inner pipe coaxially with the primary rotor, said secondary rotor comprising a plurality of permanent secondary magnets having a secondary magnetic field directed toward the primary rotor and configured to magnetically couple with the primary rotor, wherein the primary magnetic field is directed toward the secondary rotor and configured to magnetically couple with the secondary rotor, to thereby effectuate the transfer of torque from the primary rotor to the secondary rotor;
a propeller operationally attached to said secondary rotor;
a controller configured to deliver alternating current to said stator in order to urge rotation of the torque transfer assembly.

16. A fluid displacement device of claim 15, wherein said controller is configured to conduct three phase alternating electric current.

17. The fluid displacement device of claim 15 further comprising an inner pipe attached to said secondary rotor and said propeller, said inner pipe having a geometric axis coaxial with said secondary rotor.

18. The fluid displacement device of claim 17, wherein the passive magnetic bearing is further configured so that the at least one permanent magnet array is attached to the housing and the at least one permanent circular magnet is attached to the inner pipe.

19. The fluid displacement device of claim 17, wherein the passive magnetic bearing is further configured so that the at least one permanent circular magnet is attached to the housing and the at least one permanent magnet array is attached to the inner pipe.

20. The fluid displacement device of claim 17, wherein the secondary rotor is rotatably attached to said inner pipe thereby permitting rotation of said secondary rotor relative to said inner pipe, said inner pipe further comprising an induction cylinder mounted fixably and coaxially to said inner pipe, said induction cylinder having a radius larger than said inner pipe, said induction cylinder extending between said primary rotor and said secondary rotor, so as to affectuate torque transfer from the torque transfer assembly to said induction cylinder, wherein said transfer of torque from said torque transfer assembly to said induction cylinder drives rotation of said inner pipe and propeller, thereby urging the flow of fluid through said inner pipe and housing.

21. The device of claim 15 further comprising a sensor, wherein said sensor is positioned to determine the position of said rotor assembly in relation to said stator, wherein said sensor is configured to communicate said position of said rotor assembly to said controller.

22. The device of claim 21, wherein said controller is configured to selectively energize said electric coils in a rolling biphasic configuration.

23. The device of claim 21 wherein said inner pipe has a fluid bearing, said fluid bearing comprising at least one collar attached to said inner pipe, said fluid bearing configured so that the flow of fluid between said collar and said housing limits radial displacement of said collar and permits rotation of said collar relative to said housing.

24. A turbine comprising:
a housing;
a propeller comprising one or more blades;
an alternator comprising a stator and a torque transfer assembly, said stator comprising a plurality of adjacent electric coils arranged in the shape of a toroid, said stator mounted externally to the housing, said alternator comprising a torque transfer assembly, said torque transfer assembly comprising a primary rotor and a secondary rotor, said primary rotor having a plurality of permanent primary magnets positioned within the stator for passing through the stator, the plurality of permanent primary magnets having a primary magnetic field, and said secondary rotor positioned external to the stator and inside the housing, said secondary rotor positioned coaxially with said primary rotor and attached to said propeller, said secondary rotor comprising a plurality of permanent secondary magnets having a secondary magnetic field directed toward the primary rotor and configured to magnetically couple with the primary rotor, wherein the primary magnetic field is directed toward the secondary rotor and configured to magnetically couple with the secondary rotor, so that the passage of fluid through said housing and across said propeller results in rotation of said torque transfer assembly, thereby effectuating the generation of alternating current through said stator;
a passive magnetic bearing operationally attached to said secondary rotor comprising at least one permanent circular magnet and at least one permanent magnet array, configured so that said permanent magnet array couples magnetically with said permanent circular magnet in a pincher effect, wherein said at least one permanent magnet array focuses magnetic flux so as to complete magnetic circuits between said magnet array and said circular magnet, with a result that axial displacement of said secondary rotor relative to said housing causes an increase in magnetic reluctance and thereby limits axial displacement of said secondary rotor.

25. The turbine of claim 24 further comprising an inner pipe positioned within said housing, said inner pipe attached to said secondary rotor, said inner pipe further attached to said propeller.

26. The turbine of claim 25, wherein the passive magnetic bearing is further configured so that the at least one permanent magnet array is attached to the housing and the at least one permanent circular magnet is attached to the inner pipe.

27. The turbine of claim 25, wherein the passive magnetic bearing is further configured so that the at least one permanent circular magnet is attached to the housing and the at least one permanent magnet array is attached to the inner pipe.

28. The turbine of claim 25, wherein said inner pipe has at least one collar, wherein said collar is configured to generate a fluid bearing between said outer housing and said inner pipe.

* * * * *